(12) United States Patent
Straub

(10) Patent No.: US 9,010,930 B2
(45) Date of Patent: Apr. 21, 2015

(54) SUCTION GRIPPER AND MANIPULATION SYSTEM FOR OPHTHALMIC LENSES

(71) Applicant: Harro Höfliger Verpackungsmaschinen GmbH, Allmersbach im Tal (DE)

(72) Inventor: Klaus Straub, Backnang (DE)

(73) Assignee: Harro Höfliger Verpackungsmaschinen GmbH, Allmersbach im Tal (DE)

( * ) Notice: Subject to any disclaimer, the term of this patent is extended or adjusted under 35 U.S.C. 154(b) by 0 days.

(21) Appl. No.: 13/705,195

(22) Filed: Dec. 5, 2012

(65) Prior Publication Data

US 2013/0148076 A1   Jun. 13, 2013

(30) Foreign Application Priority Data

Dec. 8, 2011   (EP) .................................. 11009671

(51) Int. Cl.
  *B25J 15/06*   (2006.01)
  *G02C 7/02*   (2006.01)
  *B29D 11/00*   (2006.01)

(52) U.S. Cl.
  CPC ............ *B25J 15/0616* (2013.01); *G02C 7/022* (2013.01); *B29D 11/0024* (2013.01); *Y10S 623/907* (2013.01)

(58) Field of Classification Search
  CPC ............ G02C 7/02; G02C 7/04; G02C 7/022; A61F 9/00; A61F 9/0008; A61F 9/0017; A61F 9/0026; A61F 9/0061; A45C 11/00; A45C 11/005; A45C 11/046; B29D 11/0024; B25J 15/0616

USPC .............. 351/159.01, 178; 294/1.2; 623/6.12, 623/6.39, 907

See application file for complete search history.

(56) References Cited

U.S. PATENT DOCUMENTS

| | | | |
|---|---|---|---|
| 5,092,954 A | 3/1992 | Braun et al. | |
| 6,244,430 B1 * | 6/2001 | Travis | 206/5.1 |
| 6,318,548 B1 * | 11/2001 | Travis | 206/5.1 |
| 8,419,790 B1 * | 4/2013 | Sabti | 623/6.12 |
| 2003/0178862 A1 * | 9/2003 | Hagmann et al. | 294/1.2 |
| 2005/0103649 A1 * | 5/2005 | Vulcu et al. | 206/5.1 |
| 2005/0260051 A1 * | 11/2005 | Hamann | 409/131 |
| 2005/0263950 A1 * | 12/2005 | Hamann | 269/266 |
| 2009/0256371 A1 | 10/2009 | Nankervis et al. | |
| 2013/0197548 A1 * | 8/2013 | Keller | 606/166 |

FOREIGN PATENT DOCUMENTS

WO   2008/012152 A1   1/2008

\* cited by examiner

*Primary Examiner* — Suchin Parihar
*Assistant Examiner* — William R Alexander
(74) *Attorney, Agent, or Firm* — Gudrun E. Huckett

(57) ABSTRACT

A suction gripper for transferring ophthalmic lenses from a storage cup into a centering cup has a suction head with several suction openings and several suction cups, wherein the suction cups are positioned on a convexly rounded surface. At least some of the suction openings are arranged in the suction cups and at least one suction opening is arranged remote from the suction cups on the suction head. The suction gripper is used in a manipulation system for ophthalmic lenses that encompasses ophthalmic lenses, a storage cup, a centering cup and the suction gripper.

12 Claims, 4 Drawing Sheets

SUCTION GRIPPER AND MANIPULATION SYSTEM FOR OPHTHALMIC LENSES

BACKGROUND OF THE INVENTION

The invention relates to a suction gripper for transferring ophthalmic lenses, in particular contact lenses, from a storage cup into a centering cup, a manipulation system for ophthalmic lenses with such a suction gripper, as well as the use of such a suction gripper for transferring ophthalmic lenses from a storage cup to a centering cup.

Ophthalmic lenses such as intraocular lenses and in particular contact lenses of plastic material are usually cast in a mold and after removal from the casting mold are stored in a storage cup for further manipulation.

As an example for ophthalmic lenses and similar objects, reference is being had to contact lenses in the following. The storage cup is significantly larger than the contact lens that is intermediately stored therein so that the contact lens is located therein in an undefined position. From this undefined position, the moist contact lenses must be gripped and transferred into the final packaging. For gripping and transferring contact lenses, suction grippers are known that can grip the contact lens by suction and in the suction-secured state can transport the lens to the target location. The final packaging of the contact lens is however only insignificantly larger than the nominal size of the contact lens. In order for the contact lens to be placed properly into the target packaging, the suction gripper provided for this purpose must be sufficiently small in order to be insertable together with the contact lens adhering thereto into the target container.

In order to secure by suction a contact lens with such a small suction gripper and in order to be able to lift it, an exact mutual positional alignment of contact lens and suction gripper is required. As has been discussed above, such an exact positional alignment is however not provided in connection with an oversized storage cup, i.e., a storage cup that is significantly larger in comparison to the final packaging. The disordered random position of the contact lenses in the storage cup correlated therewith has the result that the inserted suction grippers that are inserted in an automated process cannot, or cannot reliably, attract and grip by suction the contact lenses provided in the storage cup.

A further problem in regard to the manipulation of such contact lenses is that they may not dry out and therefore must be kept moist at all times. Appropriate manipulation devices must therefore be capable of gripping and transporting the contact lenses in the moist or wet state. In this context, attention must be paid that transfer of liquid that is utilized during manipulation into the packaging container is avoided. Moreover, the contact lenses are flexible. It must therefore be avoided that the contact lenses are overextended or folded over during handling.

SUMMARY OF THE INVENTION

The object of the invention resides in that a suction gripper is to be provided with which a reliable suction action and gripping action of an ophthalmic lens that is in disordered position in an oversized storage cup is enabled.

This object is solved by a suction gripper comprising a suction head with several suction openings and several suction cups wherein the suction cups are positioned on a convexly rounded surface, wherein at least some of the suction openings are arranged in the suction cups and wherein at least one suction opening is arranged remote from the suction cups on the suction head.

The invention has furthermore the object to provide a manipulation system for ophthalmic lenses by means of which an ophthalmic lens that is positioned disordered in an oversized storage cup can be transferred into a centered position as an intermediate step before transfer into the correlated final packaging. This object is solved by a manipulation system comprising ophthalmic lenses, a storage cup, a centering cup as well as a suction gripper embodied according to the invention.

According to the invention, a suction gripper for transferring ophthalmic lenses, in particular contact lenses, from a storage cup into a centering cup is provided. The suction gripper comprises a suction head with several suction openings and with several suction cups wherein the suction cups are arranged on a convexly rounded surface. At least some of the suction openings is arranged in the suction cups while at least one (further) suction opening is arranged remote from the suction cups on the suction head.

By utilizing the flexibility of the ophthalmic lens or a comparable object, the suction cups can be hard. The expediently soft flexible suction cups that are preferably comprised of an elastomer are responsible for attracting by suction and securing by suction the ophthalmic lenses. Since the suction cups with the integrated suction openings are arranged on a convexly curved surface, some of them are always facing the ophthalmic lens independent of the random position of the lenses in the oversized storage cup. Regardless of the random lens position, at least one suction cup, preferably several suction cups, will be positioned to be able to act on the lens wherein the underpressure that is required for attracting and securing by suction is applied by means of the correlated suction openings. At the suction openings of the other suction cups that are not in contact with the ophthalmic lens and also at one or several further suction openings without suction cup there is also underpressure applied so that residual liquid is removed by suction that possibly has collected at the concave face of the ophthalmic lens. The suction cups that are in particular soft prevent damage of the sensitive ophthalmic lens and generate a high securing force. Removal by suction of the residual liquid prevents or reduces entrainment of liquid into the target container.

In the manipulation system according to the invention and the correlated method steps, the ophthalmic lens that is positioned in a disordered position within the storage cup is attracted by suction by means of the suction gripper according to the invention. At the same time, residual liquid is also removed by suction. The ophthalmic lens which is adhering to at least one suction cup of the suction gripper is lifted out of the storage cup and is transferred to a centering cup. The centering cup is advantageously also filled with liquid in order to prevent, inter alia, the ophthalmic lens from drying out. In particular, the liquid in the centering cup provides for reliable release of the ophthalmic lens from the suction gripper after the underpressure at the suction cups has been switched off. By an appropriate shape of the centering cup, the ophthalmic lens that is released from the suction gripper is automatically centered as it sinks to the bottom of the centering cup. From this centered position, it can be lifted by a further smaller suction gripper and can be transferred positionally precise to the target or final packaging.

Depending on the shape of the storage cup or its cup bottom, it may be expedient to match the rounded surface on which the suction cups are arranged with respect to its shape or its extension to the shape of the storage cup. Preferably, the convexly rounded surface on which the suction cups are arranged is a spherical cup. This is in particular advantageous when the cup bottom of the storage cup is also a spherical cup.

In this way, it is achieved that independent of the random position of the ophthalmic lens in the storage cup the same suction conditions are always existing. Expediently, the convexly rounded surface has a first radius of curvature while the cup bottom of the storage cup has a third radius of curvature. In this connection, for the suction gripper a working immersion depth into the storage cup is provided wherein the first radius of curvature of the convexly rounded surface of the suction gripper is smaller than the third radius of curvature of the cup bottom in such a way that, upon reaching the working immersion depth, a spacing to the cup bottom is provided that is at least approximately the same for several, and in particular for all, suction cups. Based on this identical spacing, it follows that always the same spacing to the ophthalmic lens, independent of its random position, is provided. Accordingly, in all positions of the ophthalmic lens a reliable attraction and securing action by suction is ensured at the suction gripper.

In an expedient further embodiment of the invention, several suction openings remote from the suction cups are arranged on the suction head. In this way, a reliable removal by suction of excessive liquid is assisted. Expediently, the at least one and in particular several suction openings remote from the suction cups are arranged to be radially recessed relative to the suction openings in the suction cups. This ensures that the radially recessed suction openings are not covered by the ophthalmic lens that is adhering to the suction cups and, in this way, they can reliably perform their removal action on the liquid.

It may be expedient to supply various suction openings or various groups thereof with different underpressure sources. Preferably, a central suction passage is arranged in the suction gripper that opens in a branched arrangement into suction openings of the suction cups and also opens into suction openings remote from the suction cups. By means of the central suction passage, all suction openings are loaded with the underpressure of the same underpressure source in a constructively simple configuration. With an appropriate configuration of the underpressure source in connection with proper sizing of the suction openings, on the one hand, a reliable attraction and securing action of the suction-attracted ophthalmic lenses is ensured and, on the other hand, an effective removal by suction of liquid is enabled at the same time.

For a reliable manipulation of an individual ophthalmic lens it may be sufficient that only a single suction cup contacts the ophthalmic lens. Preferably, the suction cups are arranged with a surface density such that at least three suction cups are positioned on a circular surface with a second base surface wherein the second base surface is smaller than or equal in size to a first base surface of the ophthalmic lens. In this way, it is achieved that the suction-attracted ophthalmic lens is secured reliably by several suction cups. Preferably, the at least three suction cups arranged on the circular surface define a triangle whose interior angles are greater than zero degrees and smaller than 180 degrees. In other words, these three suction cups are not positioned on a straight line or on a common meridian of the convexly curved surface. In the suction-attracted state, the ophthalmic lens is resting on at least three contact points defined by the correlated suction cups such that an exact positional fixation in all spatial degrees of freedom is ensured.

In a preferred embodiment, the convexly rounded surface on which the suction cups are arranged has a first radius of curvature while the ophthalmic lens has a concavely curved inner side with a second radius of curvature. In this connection, the first radius of curvature is greater than or equal in size to the second radius of curvature. This simplifies a contact of the suction-attracted ophthalmic lens at several suction cups so that the achievable securing force can be further increased.

BRIEF DESCRIPTION OF THE DRAWING

One embodiment of the invention will be explained in the following with the aid of the drawings in more detail.

DESCRIPTION OF THE PREFERRED EMBODIMENTS

Figure 1:
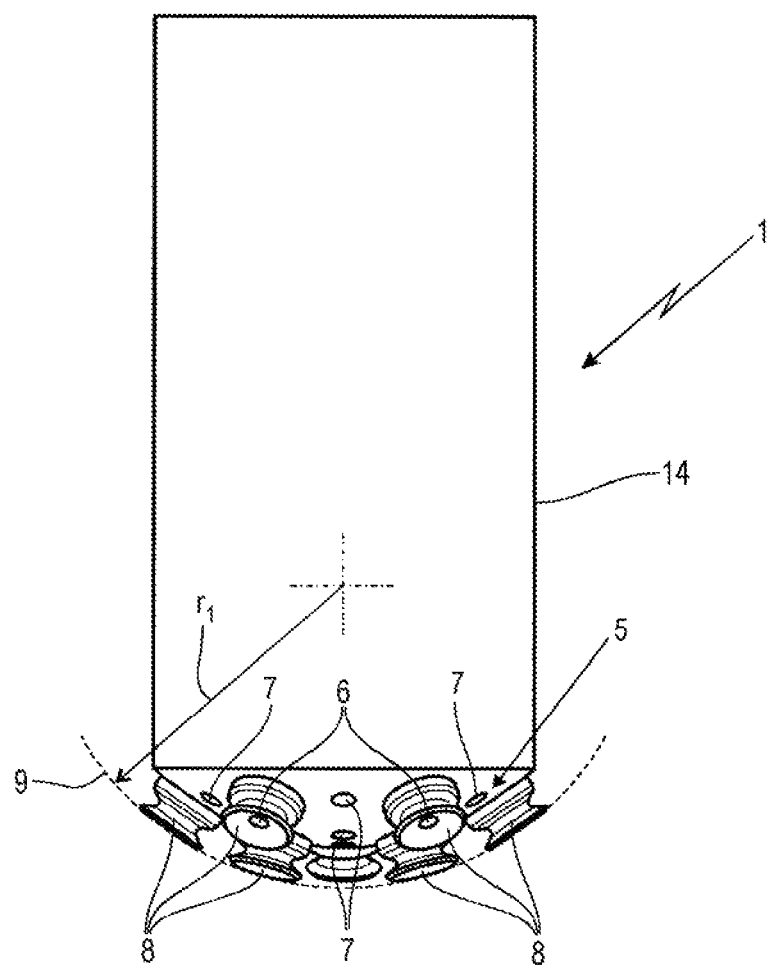
FIG. 1 shows in a side view a suction gripper according to the invention with various suction openings of which some are arranged in elastic suction cups.

FIG. 1 shows in a side view an embodiment of the suction gripper 1 according to the invention. The suction gripper 1 comprises a cylindrical shaft 14 having at its bottom side a suction head 5. The suction gripper 1 is illustrated in operative position and proper orientation with respect to gravity so that the suction head 5 is pointing downwardly in the direction of gravity.

Figure 2:
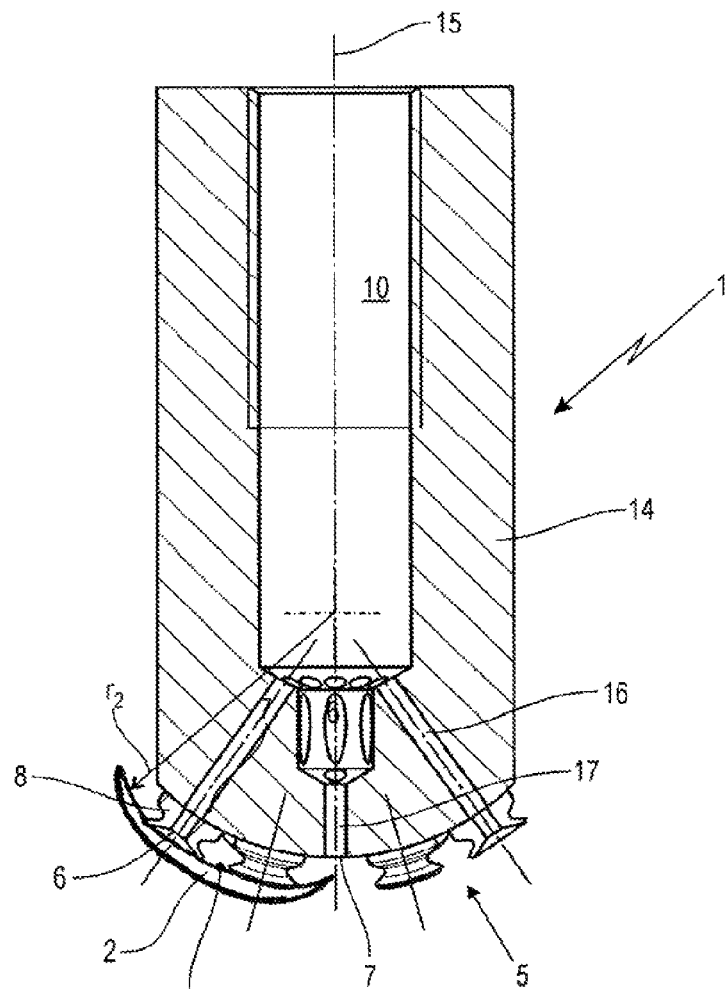
FIG. 2 is a longitudinal section illustration of the suction gripper according to FIG. 1 with a contact lens, illustrated in schematic cross-section, that is attracted by suction and is resting on the suction cups.

The suction head 5 comprises a base member that is formed integrally on the shaft 14 and has the form of a spherical section or a spherical cup. Moreover, the suction head 5 is provided with several suction openings 6, 7 as well as with several suction cups 8 that, in the illustrated embodiment, are comprised of elastic material. The suction cups 8 can however also be comprised of a hard, stiff material which, for example, is harder or stiffer than the material of the contact lens 2 to be manipulated (FIG. 2). In the latter case, the suction cups 8 can also be monolithically formed with the base member of the suction head 5, for example, of steel or stainless steel or aluminum. A suction opening 6 is formed in each individual suction cup 8 on its radial downwardly oriented side. Remote from the suction cups 8 at least one, and in this case several, further suction openings 7 are arranged on the suction head 5. These additional suction openings 7 are formed directly on the base member of the suction head 5. However, since the suction openings 6 of the suction cups 8 are located on the radial outer suction surfaces of the suction cups 8, the suction openings 7 that are formed directly in the base member of the suction head 5 and remote from the suction cups 8 are radially recessed relative to the suction openings 6 of the suction cups 8.

The suction cups 8 or their radial outer suction surfaces are arranged on a convexly curved surface 9 that is illustrated by a dashed line wherein this convexly curved surface 9 in the illustrated preferred embodiment is a spherical section or a spherical cup. The convexly rounded surface 9 on which the suction cups 8 are arranged has a first radius of curvature $r_1$.

The illustrated suction gripper 1 is used for transferring ophthalmic lenses or objects that are comparable with respect to their manipulation. The ophthalmic lenses of concern here comprise in a non-exhaustive enumeration intraocular lenses, contact lenses 2 or the like, wherein the invention in the following is explained in an exemplary fashion with the aid of the manipulation of contact lenses 2. Accordingly, the illustrated suction gripper 1 is used for transferring contact lenses 2 from a storage cup 3 into a centering cup 4, as will be explained in the following in connection with FIGS. 2 to 5. The described and illustrated embodiment of the suction gripper 1, of the manipulation system encompassing the gripper 1 and the storage cup 3 as well as the centering cup 4, and its use for transfer of contact lenses 2 from the storage cup 3 into a centering cup 4 is applicable however analogously to other ophthalmic lenses or similar objects.

FIG. 2 shows the suction gripper 1 according to FIG. 1 in a longitudinal section wherein the suction gripper 1 extends along longitudinal axis 15. Coaxial to the longitudinal axis 15, centrally in the shaft 14, a central suction passage 10 is formed. From this central passage 10, branch passages 16, 17 branch off in the area of the suction head 5. The branch passages 16 connect the suction openings 6 formed in the suction cups 8 with the central suction passage 10 while the branch passages 17 connect the suction openings 7 that are formed in the base member of the suction head 5 with the central suction passage 10. In operation, the central suction cup 10 is connectable to an underpressure or vacuum source, not illustrated, so that, as needed, at the suction openings 6, 7 an underpressure or vacuum is applied. This connection can also be separated, causing venting or pressure compensation of the suction passage 10 as well as of the branch passages 16, 17.

FIG. 2 shows moreover a schematic cross-sectional view of a contact lens 2 with a concavely curved inner side 12 wherein the contact lens 2 with its concavely curved inner side 12 is resting on or adheres to at least one, here several, suction cups 8 under the action of the underpressure that is supplied by the suction openings 6. The concavely curved inner side 12 of the contact lens 2 has a second radius of curvature $r_2$ wherein the first radius of curvature $r_1$ of the convexly rounded surface 9 that is illustrated in FIG. 1 is greater than or equal in size to the second radius of curvature $r_2$ of the contact lens 2. When looking at FIGS. 1 and 2 together, one can see that in this way the contact lens 2 can adhere to at least one and preferably several suction cups 8.

Figure 3:
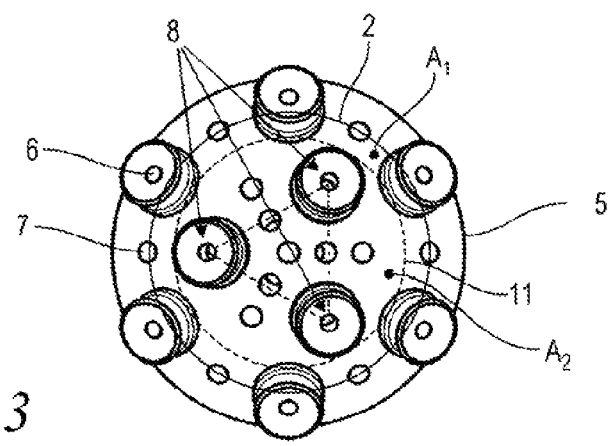
FIG. 3 is an end view of the suction gripper according to FIG. 2 with details in regard to the geometric arrangement of the suction cups and a contact lens that is centrally positioned thereat.

FIG. 3 shows an end view of the suction gripper 1 according to FIG. 1 and FIG. 2 wherein the suction head 5 is illustrated in a plan view. Here it can be seen that a total of nine suction cups 8 with correlated suction openings 6 and a total of 13 suction openings 7 remote from the openings 6 are provided. However, a different number of suction openings 6 and/or suction openings 7 may also be expedient. One possibility within the context of the invention is, for example, that exclusively suction cups 8 with suction openings 6 are provided and the other suction openings 7 that are remote therefrom are eliminated.

In contrast to the illustration of FIG. 2, a transparent contact lens 2 is shown to be centrally or concentrically arranged on the suction head 5 for simplifying the illustration of FIG. 3. The contact lens 2 has a circular first base surface $A_1$. The suction cups 8 are arranged in a regular geometric pattern such that a certain average surface density of the suction cups 8 is provided. About three suction cups 8 that are randomly selected, here about three central suction cups 8, an imaginary circular surface 11, illustrated in dashed lines, can be defined. The aforementioned surface density of the suction cups 8 is selected such that the at least three suction cups 8 including circular surface 11 have a second base surface $A_2$ wherein the second base surface $A_2$ is smaller than or equal in size to the first base surface $A_1$ of the contact lens 2. Based on the end view according to FIG. 3 and the aforementioned embodiments, the contact lens 2 that has been suction-attracted according to FIG. 2, is always resting against at least three or more suction cups 8 independent of its initial position. However, it is also within the scope of the invention to select a reduced surface density of suction cups 8 so that the contact lens 2 possibly is resting only on two or possibly only on one suction cup 8. Furthermore, in FIG. 3 it can be seen that the at least three suction cups 8 positioned on a circular surface 11 define a triangle. In the illustrated selection of suction cups 8 this triangle, indicated in dashed lines, is an isosceles triangle; however, it can have a different shape. Preferably, such a triangle is selected such that its interior angle is greater than zero degrees and smaller than 180 degrees so that the triangle has a surface greater than zero. In this way, a spatially exact positional fixation of the suction-attracted contact lens 2 at the at least three suction cups 8 is ensured. The aforementioned conditions apply not only to the three central suction cups 8 illustrated here but also to any selection of three neighboring suction cups 8 so that the same suction and adhesion conditions for the contact lens 2 exist for any spatial position.

Figure 4:
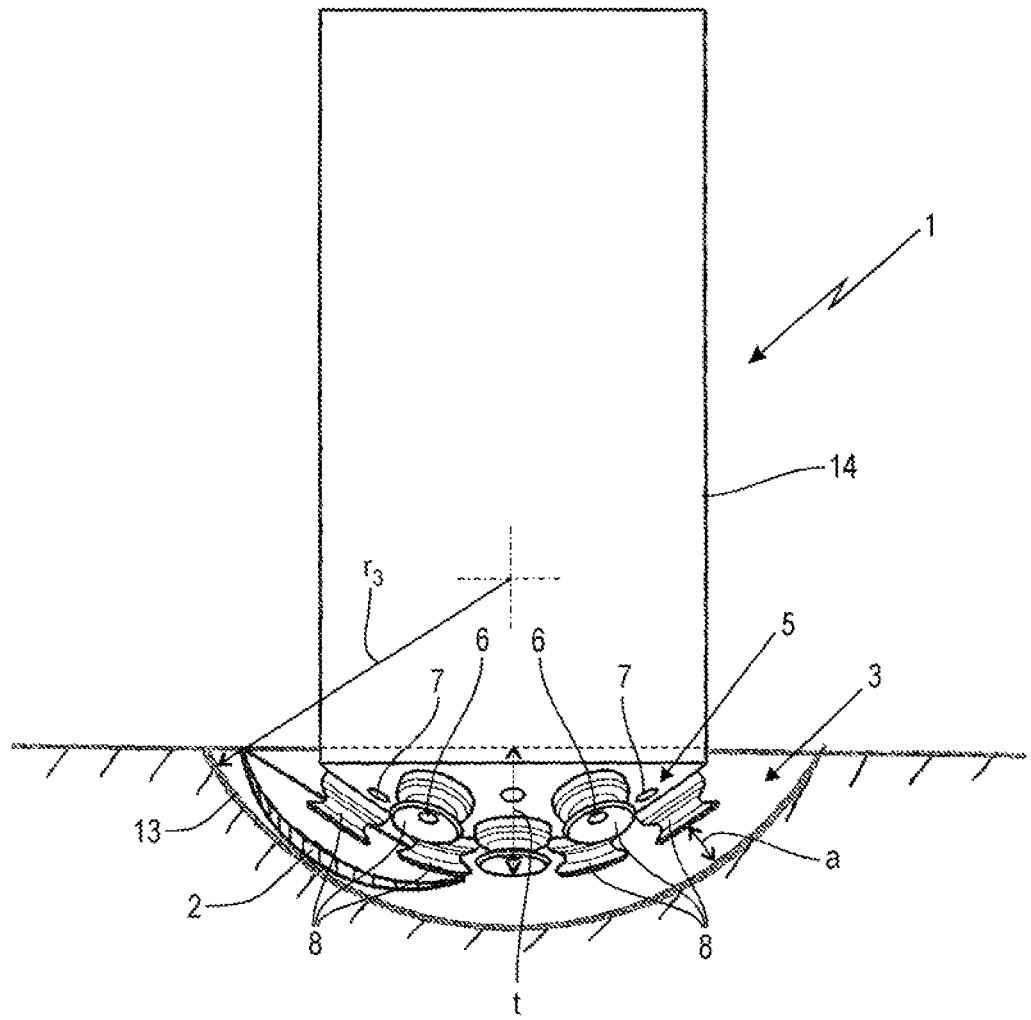
FIG. 4 is a side view of the suction gripper according to FIG. 1 in interaction with a storage cup and a contact lens that is randomly positioned therein.
Figure 5:
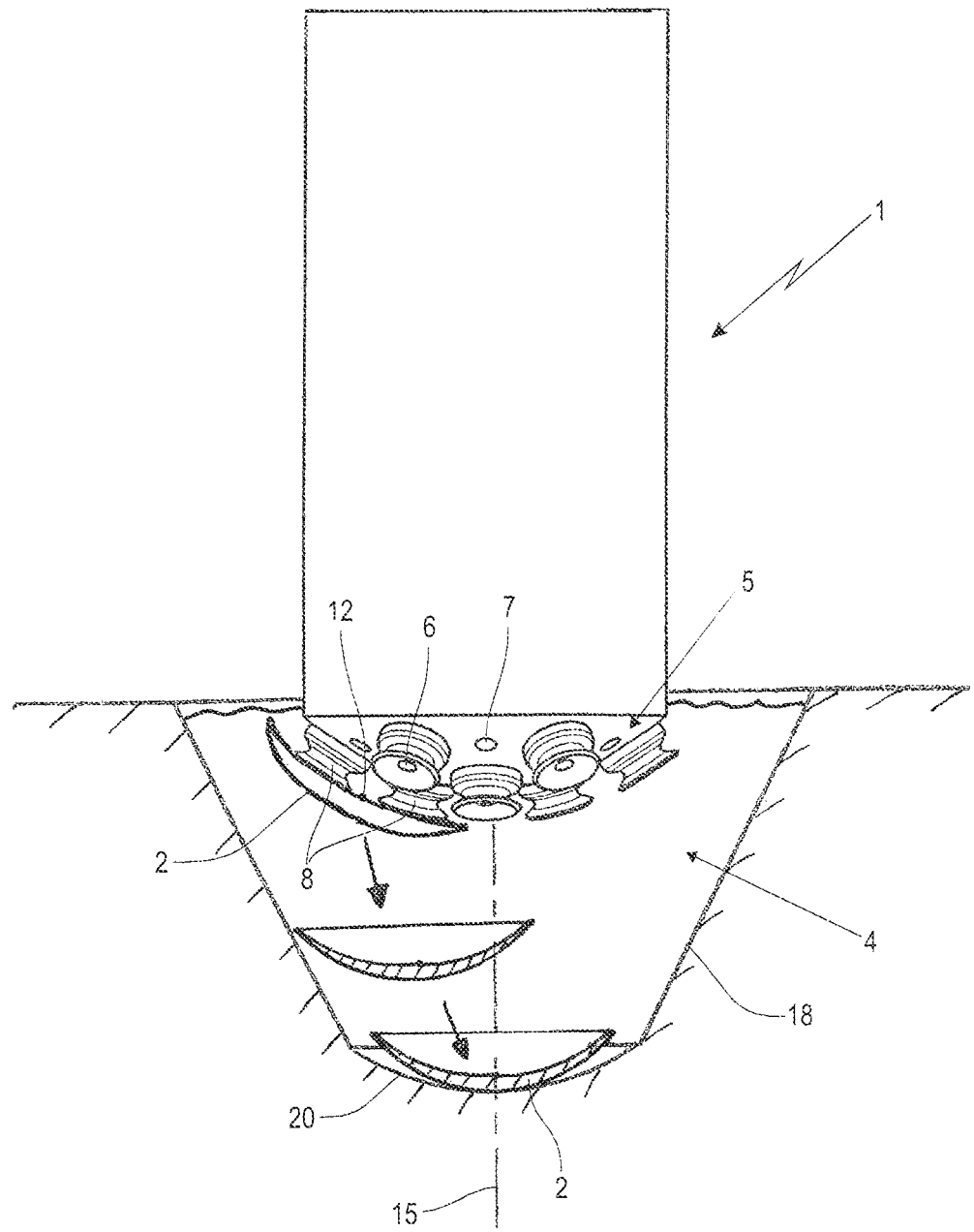
FIG. 5 shows a side view of the suction gripper according to FIGS. 1 to 4 as it deposits into a centering cup the contact lens that has been attracted and transported by suction by it.

FIGS. 4 and 5 show the inventive suction gripper 1 according to FIGS. 2 and 3 during use for transferring a contact lens 2 from the storage cup 3 into a centering cup 4. In accordance with the illustration of FIG. 4, in which the storage cup 3 is schematically shown in a cross-sectional illustration, the storage cup 3 has a convexly rounded cup bottom 13 in the form of a spherical section or a spherical cup with a third radius of curvature $r_3$. Moreover, in the storage cup 3 an individual contact lens 2 with its convexly rounded outer side is resting on the cup bottom 13. The storage cup 3, depending on the application or method step, may contain or may not contain a liquid. In the illustrated embodiment, or in the illustrated method step, such a liquid fill is not provided. As a result of the contact lens manipulation that, as a whole, is moisture-retaining, residual liquid can collected on the concave inner side of the contact lens 2. The inner diameter of the storage cup 3 is significantly greater, here more than twice as large, as the diameter of the contact lens 2. This has the result that the contact lens 2 may be lying in any position, generally not a central position, within the storage cup 3. For example, in FIG. 4 it is shown that the contact lens 2 is resting in the radial outer rim area of the storage cup 3 on the cup bottom 13. However, the contact lens 2 can also have any other position within the storage cup 3.

The suction gripper 1 is provided with a maximum working immersion depth t for insertion into the storage container 3, the depth t being measured relative to the upper rim of the storage cup 3, is provided by means of which the lowermost end of the suction gripper 1 is inserted into the storage cup 3. The radius of curvature $r_1$, illustrated in FIG. 1, of the convexly rounded surface 9 of the suction gripper 1 is so much smaller than the third radius of curvature $r_3$ of the cup bottom 13 that the same spacing a, at least approximately, exists for several, in the illustrated embodiment, for all suction cups 8 upon reaching the working immersion depth t. In this connection, the spacing a is measured perpendicular to the radial outer suction surface of the suction cups 8 or perpendicular to the adjoining section of the cup bottom 13 in the direction of a normal onto the surface. Inasmuch as a storage cup 3 is used whose cup bottom 13 deviates from the illustrated embodiment and does not have the shape of a spherical cup, the arrangement of the suction cups 8 on the suction gripper 1 is to be matched such to the actual shape of the cup bottom 13 that the afore described, at least approximately, same spacing a is provided upon reaching the working immersion depth t.

The correlated manipulation system according to the invention comprises in addition to the suction gripper 1 a correlated storage cup 3 according to FIG. 4, a correlated centering cup 4 according to FIG. 5, as well as an individual contact lens 2 according to FIGS. 2 through 5. In practical application, a plurality of storage cups 3 are arranged, for example, in a matrix in a so-called tray wherein in each individual storage cup 3 a single contact lens 2 is positioned. Moreover, each individual storage cup 3 with the contact lens 2 has correlated therewith a suction gripper 1 and a centering cup 4 (FIG. 5), respectively; this all together forms the manipulation system according to the invention. However, embodiments may be expedient in which only a single suction gripper or a small number thereof service a larger number of storage cups 3, contact lenses 2, and centering cups 4.

According to the method according to the invention, the suction gripper 1 in accordance with the illustration of FIG. 4 is first lowered with the working immersion depth t into the storage cup 3. As a result, between the suction cups 8 and the cup bottom 13 the afore described spacing a is formed. Since moreover the position of the contact lens 2 in the storage cup 3 is a random position but the contact lens 2 is always resting on the cup bottom 13, the contact lens 2 independent of its actual position has always a fixedly defined spacing to the suction cups 8 that are facing it. Independent of the actual and random position of the contact lens 2, always the same suction conditions for the contact lens 2 are provided at the suction cups 8 facing the contact lens 2.

Based on the lowered position of the suction cup 1 according to FIG. 4, the central suction passage 10 (FIG. 2) is connected to the underpressure or vacuum source so that a suction action occurs at the suction openings 6, 7. This causes the suction cups 8 that are neighboring the contact lens 2 to attract the contact lens resting on the cup bottom 13 and, in accordance with the illustration of FIGS. 2 and 3, the lens 2 is adhering to the suction cups 8. By means of the other suction openings 6, 7 that are not covered, as shown in the corresponding illustration of FIG. 2, but are also supplied with the underpressure, possibly present liquid, for example, residual liquid, is removed by suction from the concave side of the contact lens 2.

Together with the suction-attracted contact lens 2 the suction gripper 1 is subsequently lifted in accordance with illustration of FIG. 2, moved to the centering cup 4 (FIG. 5), and is lowered into the centering cup 4 in accordance with the illustration of FIG. 5. The centering cup 4 is filled with a liquid in accordance with the illustration of FIG. 5.

Before however the suction gripper 1 in accordance with the illustration of FIG. 5 is lowered into the centering cup 4, i.e., before the contact lens 2 and the suction cups 8 are immersed into the liquid of the centering cup 4, the aforementioned underpressure or the securing vacuum is switched off at the suction openings 6, 7 as soon as the suction gripper 1 is positioned immediately above the centering cup 4 or its liquid surface. Moreover, the central suction passage 10 and the branch passages 16, 17 (FIG. 2) that are branching off from the suction passage 10 are vented in order to provide pressure compensation. As a result of the adhesion action of the preferred elastic suction cups 8 and/or of the elastic contact lens 2, the contact lens 2 remains adhered initially to the suction cups 8 in accordance with the illustration of FIG. 2.

Only after the aforementioned switching off of the underpressure has take place and pressure compensation has been accomplished, the suction gripper 1 with its suction head 5 and the contact lens 2 is lowered in accordance with the illustration of FIG. 5 into the liquid reservoir of the centering cup 4. In this connection, the upwardly facing concave inner side 12 of the contact lens 2 is flushed by the liquid that is contained in the centering cup 4. This causes in the end the release of the contact lens 2 from the suction cups 8 without the suction cups 8 or the suction openings 6, 7 having to be blown out. As can be seen in FIG. 5, the contact lens 2 sinks to the bottom in the liquid reservoir of the centering cup 4 in accordance with the illustrated arrows and will come to rest on the centering bottom 20 of the centering cup 4.

The illustration according to FIG. 5 in combination with FIG. 4 also shows that the diameter of the centering cup 4 in the area of its upper opening corresponds approximately to the diameter of the storage cup 3 in the area of its upper opening. The upper opening of the centering cup 4 is thus sufficiently large so that the suction gripper 1, whose diameter is greater than that of the contact lens 2, can be inserted from above into the centering cup 4. The upper opening of the centering cup 4 is adjoined below by a circumferential wall 18 that, in the illustrated embodiment, is conically shaped but can also have a different shape. In any case, the circumferential wall 18 is shaped such that the cross-section of the centering cup 4 in the direction of gravity tapers from the top to the bottom and its diameter is reduced at the bottom so that it is smaller than that of the suction cup 5 but greater than that of the contact lens 2. The receiving space of the centering cup 4 in downward direction is closed off by means of concavely curved centering bottom 20 on which the contact lens 2 will come to rest. Further, FIG. 5 shows that the contact lens 2 that is falling off the suction head 5 glides along the downwardly tapering circumferential wall 18 down to the centering bottom 20 and in this way is centered relative to the longitudinal axis 15 of the centering cup 4 and of the suction gripper 1.

Subsequent to the afore described centering process, the contact lens 2 that is resting on the centering bottom 20 is picked up by a further suction gripper, not illustrated, wherein this further suction gripper in comparison to the suction gripper 1 according to the invention has such a reduced diameter that, on the one hand, it can be lowered into the narrowed area receiving the dropped contact lens 2 and that, on the other hand, it can deposit the contact lens 2 in a container or appropriate target packaging, not illustrated, having a size matching approximately the size of the contact lens 2.

From the above explanations it is apparent that the target container is only slightly greater than the contact lens 2 ready to be packaged while the storage cup 3 in comparison thereto is much larger. The intermediately positioned centering container 4 has in the area of its upper opening a large cross-section that approximately corresponds to the large cross-section of the storage cup 3. Moreover, the centering container 4 in the area of its centering bottom has a smaller cross-section that corresponds at least approximately to the diameter of the contact lens 2 and of the target container. The suction gripper according to the invention, with respect to the disordered position of the contact lens 2 in the storage cup 3 in accordance with the illustration of FIG. 4, has a larger diameter in comparison to the contact lens 2 and to the target or packaging container and is therefore not suited for direct depositing of the contact lens 2 in the target container. With the intermediate step of depositing the contact lens 2 in the centering container 4, the aforementioned associated problems are however overcome. The suction gripper 1 that is large in comparison to the packaging-ready contact lens can lift the randomly positioned contact lens 2 out of the storage container 3 in an operationally safe manner and transfer it into the centering cup 4. At the same time, due to the removal of residual liquid, it is prevented that this residual liquid is transferred into the liquid of the centering cup 4. From here, the centered contact lens 2 can be removed by means of the further smaller suction gripper and can be precisely positioned in the target container.

The specification incorporates by reference the entire disclosure of European priority document 11 009 671.6 having a filing date of Dec. 8, 2011.

While specific embodiments of the invention have been shown and described in detail to illustrate the inventive principles, it will be understood that the invention may be embodied otherwise without departing from such principles.

What is claimed is:

1. A suction gripper for transferring ophthalmic lenses from a storage cup into a centering cup, the suction gripper comprising a suction head with several first suction openings, at least one second suction opening, and several suction cups, wherein the suction head comprises a base member comprising an outer surface, wherein the suction cups project from the outer surface of the base member and each comprise a radial outer suction surface, wherein the radial outer suction surfaces are positioned on a convexly rounded surface extending at a radial spacing about the outer surface of the base member, wherein the first suction openings are arranged in the radial outer suction surfaces of the suction cups, and wherein the at least one second suction opening is arranged remote from the suction cups directly within the outer surface of the base member of the suction head;
   wherein a central suction passage is arranged in the suction gripper and opens in a branched arrangement into the first suction openings of the suction cups and also into the at least one second suction opening remote from the suction cups.

2. The suction gripper according to claim 1, wherein the convexly rounded surface on which the suction cups are arranged is a spherical cup.

3. The suction gripper according to claim 1, wherein several of the at least one second suction openings are arranged remote from the suction cups within the outer surface of the base member.

4. The suction gripper according to claim 1, wherein the at least one second suction opening remote from the suction cups is radially recessed relative to the first suction openings.

5. A manipulation system for ophthalmic lenses, comprising the ophthalmic lenses, a storage cup, a centering cup as well as a suction gripper according to claim 1.

6. The manipulation system according to claim 5, wherein the ophthalmic lens has a first base surface, wherein the suction cups are arranged at a surface density such that at least three suction cups are positioned on a circular surface with a second base surface, and wherein the second base surface is smaller than or equal in size to the first base surface.

7. The manipulation system according to claim 6, wherein the at least three suction cups arranged on the circular surface define a triangle having an interior angle that is greater than zero degrees and smaller than 180 degrees.

8. The manipulation system according to claim 5, wherein the convexly rounded surface on which the suction cups are arranged has a first radius of curvature, wherein the ophthalmic lens has a concavely curved inner side with a second radius of curvature, and wherein the first radius of curvature is greater than or equal in size to the second radius of curvature.

9. The manipulation system according to claim 8, wherein the storage cup has a convexly rounded cup bottom with a third radius of curvature, wherein the suction gripper is provided with a working immersion depth for insertion into the storage cup, and wherein the first radius of curvature of the convexly rounded surface of the suction gripper is so much smaller than the third radius of curvature of the cup bottom that, upon reaching the working immersion depth, the same spacing, at least approximately, exists for several suction cups relative to the cup bottom.

10. The manipulation system according to claim 9, wherein the first radius of curvature of the convexly rounded surface of the suction gripper is so much smaller than the third radius of curvature of the cup bottom that upon reaching the working immersion depth the same spacing, at least approximately, exists for all suction cups relative to the cup bottom.

11. Use of a suction gripper according to claim 1 for transferring ophthalmic lenses from a storage cup into a centering cup.

12. Use according to claim 11, in a manipulation system for ophthalmic lenses, comprising the ophthalmic lenses, a storage cup, a centering cup and the suction gripper.

* * * * *